United States Patent Office 3,416,961
Patented Dec. 17, 1968

3,416,961
PROCESS FOR THE SEPARATION OF
FRUCTOSE AND GLUCOSE
Cyril Benjamin Mountfort, Pymble, New South Wales, Beverly Cortis-Jones, Seaforth, New South Wales, and Richard Thomas Wickham, Lakemba, New South Wales, Australia, assignors to The Colonial Sugar Refining Company Limited, Sydney, New South Wales, Australia, a company of New South Wales
Filed Dec. 22, 1964, Ser. No. 420,319
Claims priority, application Australia, Jan. 7, 1964,
39,494/64
7 Claims. (Cl. 127—46)

ABSTRACT OF THE DISCLOSURE

Process for separating fructose and glucose in which a syrup containing a mixture of fructose and glucose is admitted to a column charged initially with a water-immersed bed of an alkaline earth metal salt of a suitably cross-linked nuclearly sulphonated polystyrene cation exchange resin, whereby the fructose is preferentially absorbed by the resin and is subsequently washed therefrom after displacing the surrounding glucose-enriched solution. The effluent from the column is divided into at least six fractions, at least two of which are then recycled to the column in a specified sequence with respect to additional syrup feed and water feed.

---

Figure 1:
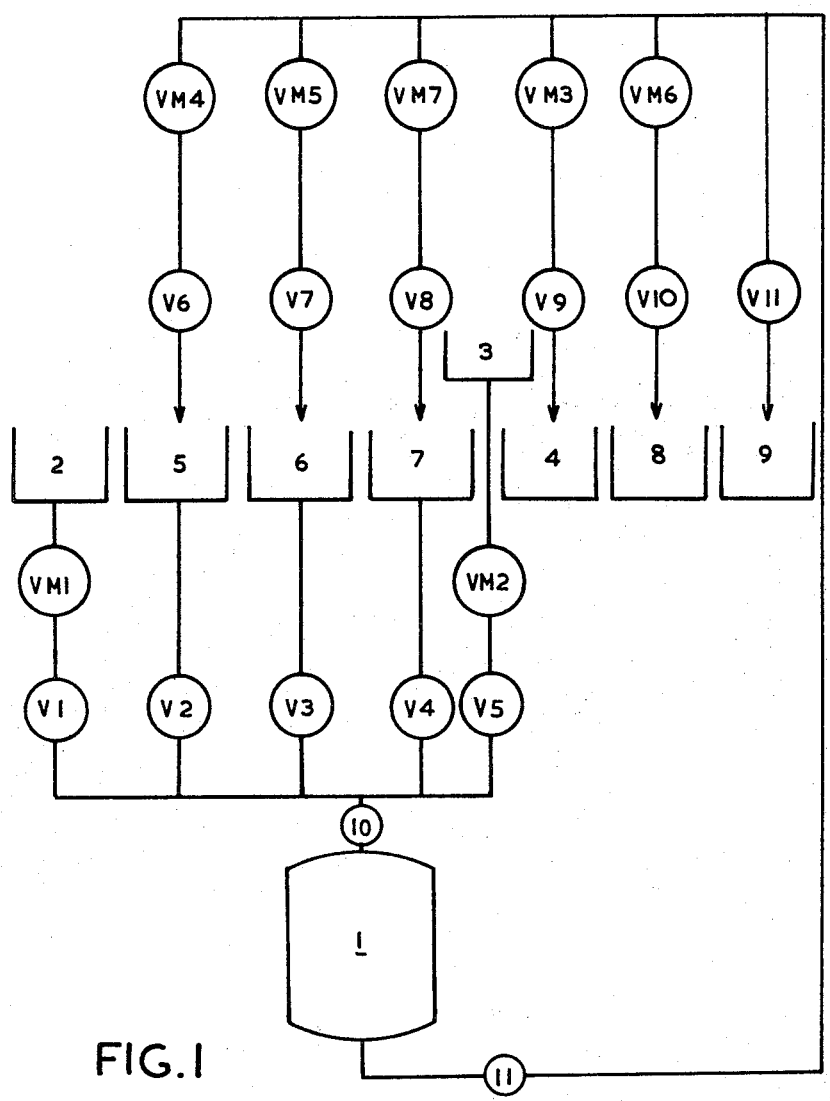

The present invention provides a new process and apparatus for the separation of fructose and glucose from syrups containing them. The invention is particularly useful for the commercial production of fructose and glucose (or fructose-rich and glucose-rich syrups) from invert syrups.

It is common knowledge that when a syrup containing sucrose is hydrolysed with acid or enzyme, equal parts of fructose and glucose are formed and the product is known as invert syrup.

The prevention of this hydrolysis is an object in the commercial production of cane or beet sugar. On the other hand sucrose is deliberately converted to invert sugar in the manufacture of certain non-crystallizing syrups, e.g., golden syrup and treacle.

While sucrose and glucose are produced on a very big scale for use in high energy foodstuffs and a great number of technical products, the commercial use of fructose has been very limited up to date. Fructose, a sugar of great sweetness and general utility, has hitherto been made only at high cost and in small quantities by acid hydrolysis of plant polyfructosans (e.g., insulin, found in Jerusalem artichokes, dahlias and certain other plants).

The great commercial potential of fructose is undisputed and is related to the fact that fructose may be readily converted to mannitol. In the present method of manufacturing mannitol from invert syrup, 3 parts molar of sorbitol are obtained as a by-product for every 1 part molar of mannitol. On the other hand, pure fructose syrup yields only 1 part molar of sorbitol for every 1 part molar of mannitol.

It is known in principle to effect a separation of fructose and glucose by bringing their aqueous solution into contact with the calcium salt of a suitably cross-linked nuclearly sulphonated polystyrene cation exchange resin. Fructose is preferentially absorbed by the resin and glucose preferentially remains in the surrounding aqueous liquid. The fructose is subsequently washed out of the resin after displacing the surrounding glucose-enriched solution.

It is an object of the present invention to achieve a commercially attractive separation of fructose and glucose from a syrup containing them.

It is a further object of the invention to produce economically syrups containing in excess of 50% by weight fructose based on dry solids.

The objects of the invention are achieved by a process comprising the steps:

(1) sequentially admitting predetermined volumes of the syrup and water to a column charged with a water-immersed bed of the alkaline earth metal salt of a cross-linked nuclearly sulphonated polystyrene cation exchange resin;
(2) separating the effluent from the column sequentially into at least the fractions—(i) sweet water (I) consisting of dilute glucose-rich solution,
   (ii) concentrated glucose-rich solution,
   (iii) recycle (I) consisting of concentrated glucose-rich solution highly contaminated with fructose,
   (iv) recycle (II) consisting of concentrated fructose-rich solution highly contaminated with glucose,
   (v) concentrated fructose-rich solution,
   (vi) dilute fructose-rich solution;
(3) admitting sequentially to the column at least the fractions—
   (xi) recycle (I),
   (xii) predetermined volume of said syrup,
   (xiii) recycle (II),
   (xiv) predetermined volume of water;
(4) repeating steps 2 and 3 in a cyclic manner.

Feed volumes identified above as "predetermined" will be defined subsequently.

Typical resins usable according to the invention are the nuclearly sulphonated polystyrene cation exchange resins cross-linked with divinylbenzene, examples of which are those known under the registered trademarks Dowex 50W and Zeo Karb 225.

We have found that resins having a low cross-linkage content (e.g., 1% divinylbenzene by weight) and having a high cross-linkage content (e.g., 12% divinylbenzene by weight) are less effective than those having intermediate cross-linkage content (2% to 8% divinylbenzene by weight). It is particularly preferred to employ a cross-linkage content of about 4% by weight.

The most usable resins have a particle size in the mesh range 20–100 (U.S. Standard Sieve) and resins having a particle size in the mesh range 35–70 (U.S. Standard Sieve) are preferred.

Regardless of whether the selected alkaline earth metal is calcium, strontium or barium, the aforesaid salts of the cation exchange resins are equally suited to the process according to the invention. It is, however, preferred to employ the calcium salts because of their cheapness and non-toxicity.

The invention also provides apparatus for carrying out the process described above. Broadly, this apparatus comprises: a column adapted to be charged with the alkaline earth metal salt of a cross-linked nuclearly sulphonated polystyrene cation exchange resin; said column having a top distributor for admitting solutions uniformly to the upper surface of the resin, and having a bottom distributor for collecting effluent uniformly from the lower surface of the resin; said top distributor being connected to pipes leading respectively to: a storage tank for syrup, a storage tank for water, a storage tank for recycle (I) solution, a storage tank for recycle (II) solution; said bottom distributor being connected to pipes leading respectively to: a storage tank for concentrated glucose-rich solution, a storage tank for concentrated fructose-rich solution, said storage tank for recycle (I) solution, said storage tank for recycle (II) solution, storage tank means for containing dilute fructose-rich solution and sweet water (I) consisting of dilute glucose-rich solution; a feed pump for transferring solutions from specified tanks to said top distributor; an effluent pump for transferring solutions from said bottom distributor to specified tanks; valves for controlling the flow of solutions to and from the column; volume control means for controlling the operation of said valves whereby to carry out the defined process; and means for preventing intermixing of feed fractions above the resin in the column.

In spite of the fact that a greater separation of fructose and glucose can be achieved at ambient temperature (about 20° C.) than at elevated temperature (say, 50° C.–70° C.), the latter are preferred. This is related to the fact that concentrated syrups are viscous and slow-moving at low temperatures and their dilution entails increased evaporation costs. We have found a convenient compromise temperature to be about 60° C.

Suitably, the process may be conducted at the desired temperature by ensuring that the storage tanks containing feed solutions are provided with heating means. The column containing the resin may also be lagged to minimize heat losses.

We have also found that further improvements in the separation of fructose and glucose may be achieved by introducing additional refinements into the recycling procedure broadly outlined above. Higher yields of fructose may be obtained, for example, by submitting the effluent dilute fructose-rich solution (vi) to recycling. It is still more preferred to divide this effluent into the fractions (vi)(a) and (vi)(b), the former consisting of a dilute fructose-rich solution and the latter consisting of a very dilute fructose-rich (sweet water) solution; the former is then submitted to recycling (and is herein identified as recycle (III)). The apparatus is of course adapted suitably to allow for these further refinements.

The invention is carried out commercially in an apparatus which may be readily adapted for automatic operation and of which a diagrammatic arrangement is shown in FIGURE 1 of the annexed drawings. Identifications included in the drawing correspond to identifications of parts of the apparatus described in the following list.

(1) A vertical column adapted to be charged with a cation exchange resin of the type described, and fitted with a top distributor for admitting solutions uniformly to the upper surface of the resin and with a bottom distributor for collecting effluent solutions uniformly from the bottom of the resin bed.

(2) A storage tank for syrup feed solution (e.g. invert syrup).

(3) A storage tank for feeding water.

(4) A storage tank for receiving concentrated glucose-rich solution.

(5) A storage tank for recycle (I) solution.

(6) A storage tank for recycle (II) solution.

(7) A storage tank for recycle (III) solution.

(8) A storage tank for concentrated fructose-rich, solution.

(9) A storage tank for sweet waters (I) consisting of dilute glucose-rich solution and (II) consisting of very dilute fructose-rich solution.

(10) A feed pump for transferring syrup, water, recycle (I), recycle (II) and recycle (III) solutions from their respective tanks to the top distributor in the column.

(11) An effluent pump for transferring the effluent from the bottom distributor in the column to the concentrated glucose-rich solution tank, the recycle (I) tank, the recycle (II) tank, the concentrated fructose-rich solution tank, the recycle (III) tank and the sweet waters (I) and (II) tank.

(12) Valves V1 to V11 and volume control means VM1 to VM7 for directing the flow of solutions to and from the column and the various tanks in accordance with the desired method of operation. In addition to the above, there are also provided:

(13) Heating means for keeping the contents of the various feed tanks at approximately 60° C. and means for insulating the resin column to minimise heat losses.

(14) Means to allow the resin bed to be backwashed with water periodically to remove accumulated dirt, etc.

Figure 2:
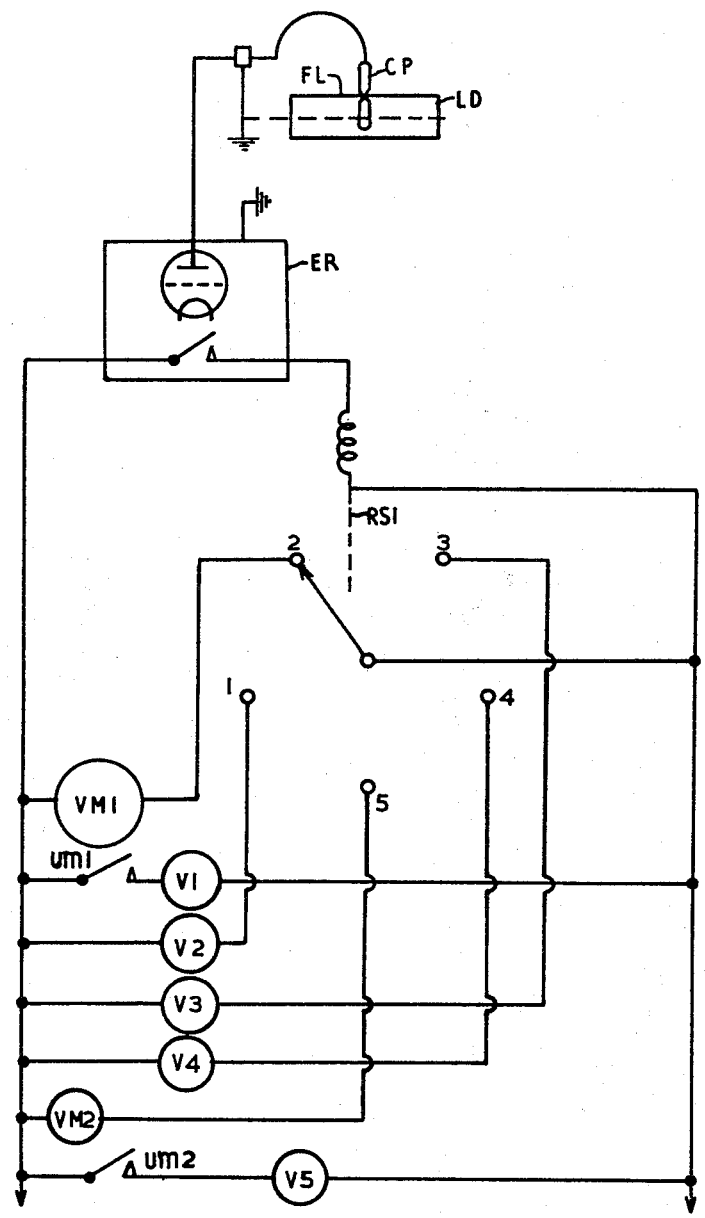

(15) A feed control system discussed subsequently in relation to FIGURE 2 of the annexed drawings.

Figure 3:
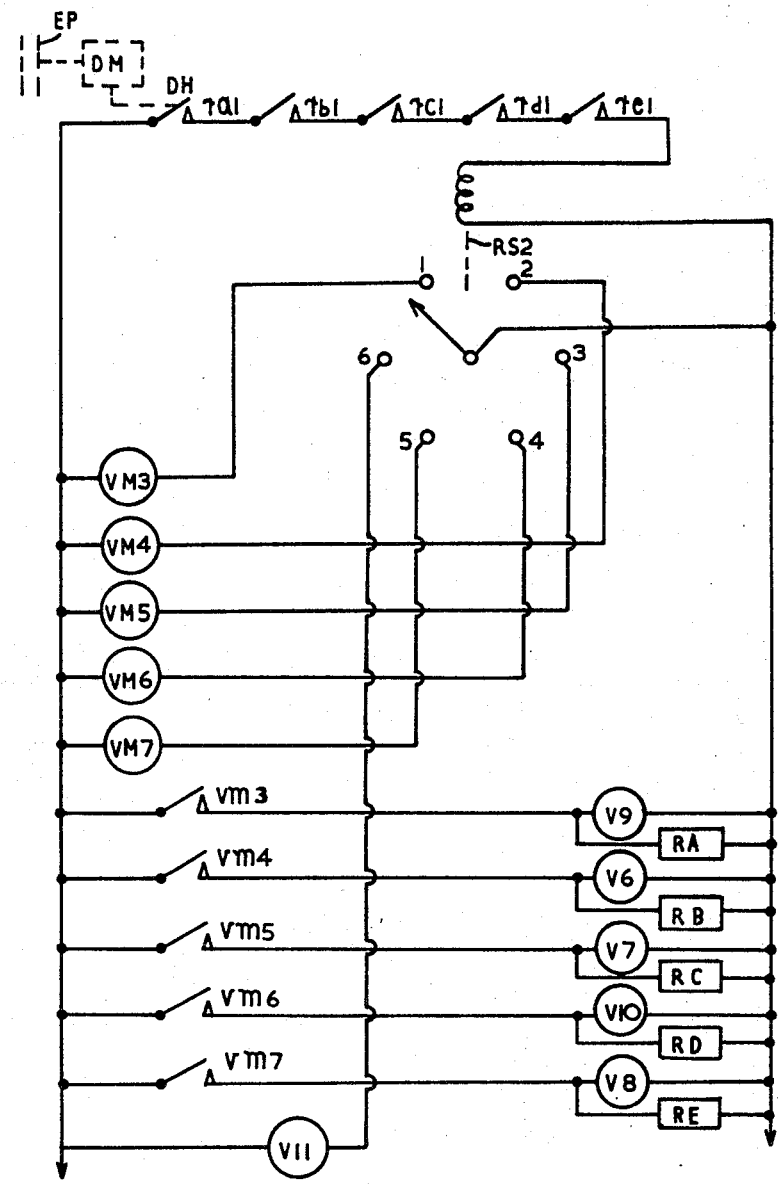

(16) An effluent control system discussed subsequently in relation to FIGURE 3 of the annexed drawings.

Suitably, the resin bed depth in the column is six feet, but bed depths greater and smaller than this can be used with satisfactory results. It will be appreciated that the resin undergoes a volume change during the operating cycle (shrinking with increasing sugar concentration within the resin) and the resin surface rises and falls.

At the start of the operation the column is half full of a water immersed resin bed. The water level is lowered to the upper surface of the resin and a predetermined volume of syrup (50% by weight soluble solids) is fed to the top of the column. The effluent consists first of water only, but is gradually enriched in glucose. This effluent is directed to the sweet water tank 9 until a density measuring instrument or other suitable device detects the presence of a predetermined concentration of glucose therein, whereupon the effluent (containing 60% to 90% by weight glucose based on dry solids) is then directed to the concentrated glucose-rich solution tank 4. After a predetermined volume of this concentrated glucose-rich fraction is collected in tank 4, the effluent is switched to recycle (I) storage tank 5 wherein there is collected a predetermined volume of a solution containing more than 50% by weight glucose based on dry solids. Then the effluent is directed to recycle (II) storage tank 6 wherein there is collected a predetermined volume of a solution containing more than 50% by weight fructose based on dry solids. The effluent is then switched to the concentrated fructose-rich solution tank 8 wherein there is collected a predetermined volume of solution (containing 60% to 90% by weight fructose based on dry solids). Volumes of effluent collected in recycle (I) and recycle (II) storage tanks, identified above as "predetermined," will be defined subsequently.

In a preferred cycle of operations, the next step is to direct the effluent flow to storage tank 7 to collect recycle (III) solution. This solution is actually richer in percentage frustose (based on dry solids) than the preceding fructose-rich fraction, but it is much more dilute. For reasons of economy in evaporation, it is preferred therefore to return it to the column as a recycle fraction rather than to allow it to mix with the previous fructose-rich fraction. Finally, the effluent is directed to the sweet water tank 9, and the effluent cycle is repeated.

The process may, of course, be operated successfully without separating sweet water from recycle (III) solution; however, by collecting recycle (III) as a separate fraction, the concentration of total solids in the fructose-rich effluent fraction is increased and the economy of the process is improved.

Other variations in the effluent cycle within the scope of the appended claims will be apparent to those skilled in the art.

As indicated above, it is preferred not to submit sweet water fractions per se to recycling, however, this very dilute solution may be disposed of advantageously by using it to dilute invert syrup feed solution to the required concentration.

At the start of the feeding cycle, when the required amount of invert syrup has been applied to the top of the resin column, this is followed by a predetermined volume of water. After the water feed, the contents of recycle (I) storage tank are fed to the column followed by a further predetermind volume of invert syrup.

After this stage of the feeding cycle (and after all subsequent equivalent stages) and invert syrup feed is not followed by water but by the contents of the recycle (II)

storage tank then the contents of the recycle (III) storage tank (if the effluent has been divided into such a fraction). Only then is a water feed introduced, followed by the contents of the recycle (I) tank.

After a number of successive cycles an equilibrium is reached at which the following material balances apply—

*Mass balance* (*solids basis*): Invert syrup=concentrated glucose—rich fraction+concentrated fructose-rich fraction+sweet water.

*Volume balance*: Invert syrup+water=concentrated glucose-rich fraction+concentrated fructose-rich fraction+sweet water.

Figure 4:
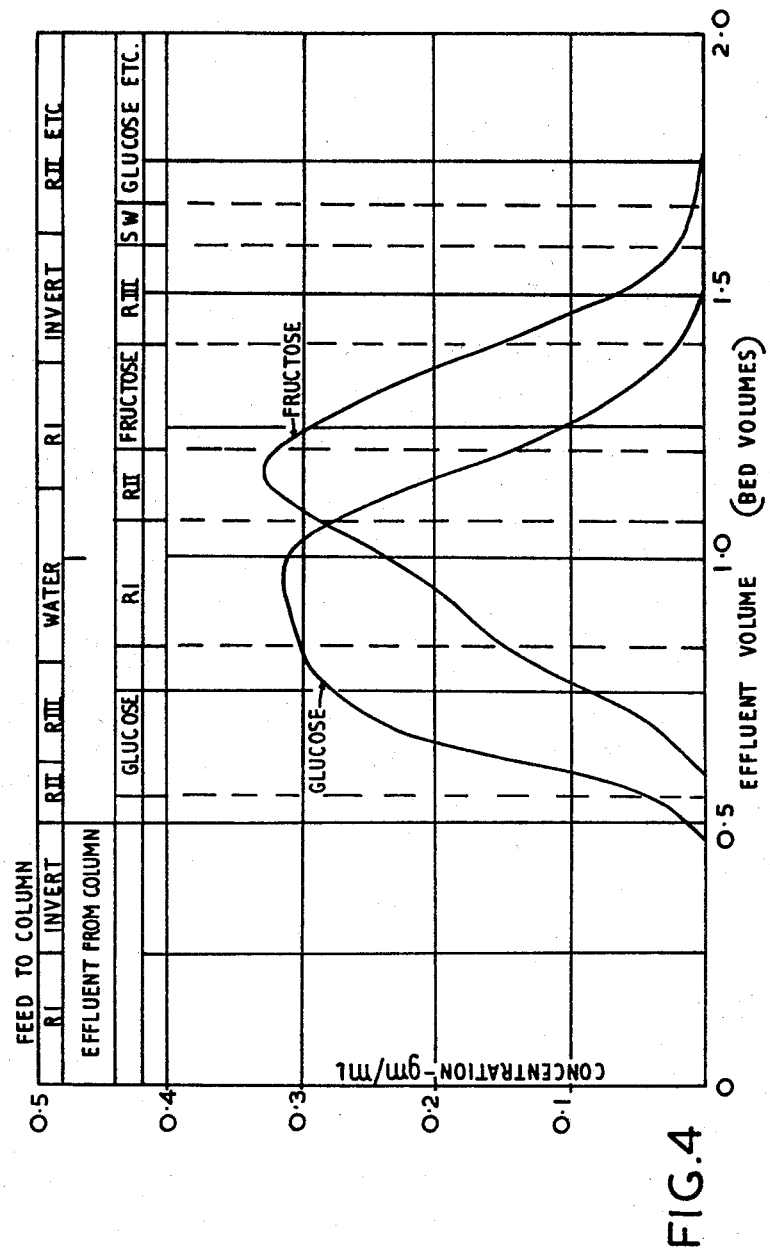

In FIGURE 4 we give a graph relating effluent volumes at equilibrium to the concentrations therein of fructose and glucose. The relative slope and disposition of the fructose/glucose curves are constant under these conditions for a given resin and a given flow rate of solution. An effluent flow rate of 40 imperial gallons per hour per square foot of resin (cross-sectional area) has been found satisfactory, though rates greater or less than this may be used. By suitable adjustment of the feed water volume, successive effluent cycles may be made to follow each other closely with a small overlap between them as shown in the figure.

EXAMPLE 1

Apparatus was set up according to the general scheme indicated in FIGURE 1, and employed to obtain a fructose-enriched syrup from invert syrup having a 50% by weight soluble solids total solids concentration (comprising 50% fructose and 50% glucose). The resin employed in the column was Dowex 50W having a cross-linkage content of 4% divinylbenzene, and a particle size in the mesh range 35-70 (U.S. Standard Sieve). At the start of the process the resin bed height was six feet. Heating and insulation means were employed to maintain a temperature of 60° C. in the feed solutions and the column. The effluent flow rate was 40 imperial gallons per hour per square foot of resin (cross-sectional area).

At equilibrium, fractional feed and effluent volumes (expressed as fractions of the resin bed volume) were as follows:

Feed volume to column:
  Recycle (I) _____ 0.241
  Invert syrup_____ 0.241
  Recycle (II)_____ 0.130
  Recycle (III)_____ 0.185
  Water _____ 0.332
    Total _____ 1.129

Effluent volume from column:
  Concentrated glucose-rich_____ 0.298
  Recycle (I)_____ 0.241
  Recycle (II)_____ 0.130
  Concentrated fructose-rich_____ 0.201
  Recycle (III)_____ 0.185
  Sweet Water_____ 0.074
    Total _____ 1.129

The effluent analysis was as follows: the concentrated glucose-rich fraction had a total solids concentration of 24% by weight, of which 78% was glucose and 22% was fructose; the concentrated fructose-rich fraction had a total solids concentration of 29% by weight, of which 82% was fructose and 18% was glucose; the sweet water had a total solids concentration of 1% by weight, substantially all of which was fructose.

This effluent analysis corresponds to that given in FIGURE 4.

The volumes of the fractions may differ from the values shown above, depending on the resin used and on the desired purity and concentrations of the product fractions.

EXAMPLE 2

Apparatus was set up as for EXAMPLE 1 and again employed to obtain a fructose-enriched syrup from invert syrup having a 50% by weight total solids concentration (comprising 50% fructose and 50% glucose). The resin was selected as before and operating conditions were duplicated in all respects except that fractional feed and effluent volumes (expressed as fractions of the resin bed volume) were as follows:

Feed volume to column:
  Recycle (I) _____ 0.164
  Invert syrup _____ 0.178
  Recycle (II) _____ 0.208
  Recycle (III) _____ 0.186
  Water _____ 0.331
    Total _____ 1.067

Effluent volume from column:
  Concentrated glucose-rich _____ 0.285
  Recycle (I) _____ 0.164
  Recycle (II) _____ 0.208
  Concentrated fructose-rich _____ 0.142
  Recycle (III) _____ 0.186
  Sweet water _____ 0.082
    Total _____ 1.067

The effluent analysis was as follows: the concentrated glucose-rich fraction had a total solids concentration of 23% by weight, of which 75% was glucose and 25% was fructose; the concentrated fructose-rich fraction had a total solids concentration of 24% by weight, of which 95% was fructose and 5% was glucose; the sweet water had a total solids concentration of 2% by weight, substantially all of which was fructose.

It can be seen that the quantity of invert syrup feed per cycle is determined by the desired purity of the product fraction.

For a given resin bed volume and given volume of water feed, increasing the volume of syrup feed leads to a reduced efficiency of separation; contrariwise, reducing the volume of syrup feed leads to an increased efficiency of separation.

Particular feed volumes of syrup and recycled fractions required to enable the preparation of a product of desired purity may be determined easily by experiment; such feed volumes are herein described as "predetermined."

It will be understood that, at the beginning of a cycle, the volume of water feed is selected to elute the majority of sugars from the column and is thus dependent on the nature of the resin and the resin bed volume.

Subsequent additions of water are determined by the fact that the total feed volume to the column during step 3 of the hereinbefore defined process should equal substantially the total feed volume to the column during step 1 of this process. Feed volumes of water which satisfy these criteria are all described herein as "predetermined."

If the operating cycle is adjusted to produce a concentrated fructose-rich effluent having a high fructose content (e.g., 95% fructose and 5% glucose as in Example 2), it is quite practicable to evaporate this effluent product to a high total solids concentration (e.g., 88% by weight) and then to crystallise out a solid fructose product. Suitably, the concentrated effluent is placed in a crystalliser (e.g. at 55° C.) and fructose crystals are added to seed the solution; the temperature is then slowly lowered and a substantial yield of crystalline fructose is obtained which may be separated from the mother liquor in a centrifuge.

Similarly, a concentrated glucose-rich fraction may be evaporated and cooled, etc. to yield crystalline glucose.

The process according to the invention is best carried out automatically. A suitable method of automatic operation is described below in relation to FIGURE 2 (illustrating a feed cycle control system) and FIGURE 3 (illustrating an effluent cycle control system).

The feed cycle control system includes:

(1) A differential level controller LD which is mounted in the column above the resin. This controller determines when feed fractions should go to the column and is instrumental in preventing mixing of feed fractions above the resin surface.

(2) A cycle control circuit comprising an electronic relay ER and a rotary switch RS1 for introducing feed fractions to the bed in correct sequence.

(3) Volume control means VM1 and VM2 which control respectively the quantity of invert syrup and hot water introduced per cycle.

The differential level controller LD includes a float FL so constructed that its liquid displacement is approximately ½″. A conductivity probe CP is mounted on the float FL so that the lower part of the probe is about ¼″ above the base of the float, i.e., it may be submerged to about ¼″. The float FL is thus adapted to float on feed liquid with the probe submerged until the liquid level falls to about ½″ above the resin surface. The float then rests on the resin surface while the liquid level continues to fall. When the liquid level above the resin surface falls to below about ¼″, the liquid breaks contact with the conductivity probe CP.

The conductivity probe is electrically connected to an electronic relay ER of the thyratron type which includes a standard type relay. The contacts of this relay are open when the conductivity probe is submerged, and vice versa. The relay energises the feed cycle control switch RS1 which opens the feed valves V1 to V5 in the correct sequence to allow respective feed fractions to be introduced.

The volume control means VM1 and VM2 are of a known type which, on closure of a starting circuit, causes a load contact to close whereby to open a valve (V1 or V5) in the pipeline system and permit flow therethrough (of invert syrup or hot water). After a predetermined volume of liquid has passed through the volume control means the load contact opens and so closes the respective valve. When the starting circuit is broken the volume control means resets in preparation for a subsequent cycle and the load contact remains open until the starting circuit is again closed.

At the beginning of a cycle there is a depth of water over the resin bed surface and effluent is being continuously withdrawn. The float FL is floating on the water with the probe CP submerged. The feed cycle control switch RS1 is in position 5. When the level of water above the resin surface falls below ¼″, the water breaks contact with the conductivity probe CP on the float FL. This break in contact is detected by the electronic relay ER which in turn moves the feed cycle control switch RS1 to position 1. This resets the volume control means VM2 by breaking its circuit at contact 5, and opens the valve V2 allowing the Recycle (I) fraction to flow into the column until the tank is empty. As the Recycle (I) fraction flows into the column at a faster rate than effluent is withdrawn the level of liquid above the resin surface rises, the conductivity probe CP is again submerged and the electronic relay ER is reset. When the liquid level above the resin surface again falls below ¼″ the liquid breaks contact with the conductivity probe CP on the float FL. This break in contact is again detected by the electronic relay ER which moves the feed cycle control switch RS1 to position 2. This closes the valve V2 by breaking the circuit at contact 1 and energises the volume control means VM1 which in turn opens the valve V1 by closing contact vm1, allowing invert syrup to flow through the volume control means VM1 and valve V1 to the column. After the predetermined volume of invert syrup has passed through the volume control means VM1, valve V1 is closed by interrupting the circuit for valve V1 and vm1. As the invert syrup flows into the column at a faster rate than effluent is withdrawn the level of invert syrup above the resin surface rises, the conductivity probe CP is again submerged and the electronic relay ER is reset. When the level of invert syrup above the resin surface again falls below ¼″ the liquid breaks contact with the conductivity probe CP in the float FL. This break in contact is again detected by the electronic relay ER which moves the feed cycle control switch to position 3. This resets the volume control means VM1 by breaking its circuit at contact 2 and opens valve V3 by closing the circuit at contact 3, allowing Recycle (II) fraction to flow into the column until the tank is empty. As the Recycle (II) fraction flows into the column at a faster rate than effluent is withdrawn the level of Recycle (II) fraction above the resin surface rises, the conductivity probe CP is again submerged and the electronic relay ER is reset. When the level of Recycle (II) fraction above the resin surface falls below ¼″ the liquid breaks contact with the conductivity probe CP in the float FL. This break in contact is again detected by the electronic relay ER as described above and the feed cycle control switch moves to position 4. This movement closes valve V3 by breaking the circuit at contact 3 and opens valve V4 by making the circuit at contact 4, allowing Recycle (III) fraction to flow into the column until the tank is empty. As the Recycle (III) fraction flows into the column at a faster rate than effluent is withdrawn the level of Recycle (III) fraction above the resin surface rises, the conductivity probe CP is again submerged and the electronic relay ER is reset. When the level of Recycle (III) fraction above the resin surface falls below ¼″ the liquid breaks contact with the conductivity probe CP on the float FL. This break in contact is again detected by the electronic relay ER as described above and the feed cycle control switch moves to position 5. This movement closes the valve V4 by breaking the circuit at contact 4 and energises the volume control means VM2 which in turn opens the valve V5 by closing contact vm2, allowing hot water to flow through the volume control means VM2 and valve V5 to the column. After the predetermined volume of hot water has passed through the volume control means VM2 the valve V5 is closed by interrupting the circuit at vm2. As the hot water flows into the column at a faster rate than effluent is withdrawn the level of liquid above the resin surface rises, the conductivity probe CP is again submerged and the electronic relay ER is reset. This completes one full cycle of operation and the control circuit is now in the same state as described at the beginning of the cycle.

The effluent cycle control system (shown in FIGURE 3) includes:

(1) A density measuring instrument of conventional type DM which measures the density of the effluent flowing in the pipeline EP and transmits an electric or pneumatic signal to operate a switch DH when the density of the effluent exceeds a predetermined value.

(2) A cycle control rotary switch RS2 for diverting the effluent to its various destinations in the correct sequence.

(3) Volume control means VM3 to VM7 which control respectively the flow of effluent to the concentrated glucose-rich solution storage tank, the Recycle (I) solution storage tank, the Recycle (II) solution storage tank, the concentrated fructose-rich solution storage tank, and the Recycle (III) solution storage tank. These are of the same known type as VM1 and VM2 described for the feed cycle control system.

(4) Relays RA to RE each with a single normally closed contact ra1 to re1.

At the beginning of a cycle sweet water (of low density) is being withdrawn from the column via the effluent pipeline EP and the switch DH is open. The rotary switch RS2 is in position 6 and the valve V11 is open directing the effluent to the sweet water tank. Valves V6 to V10 are all closed, relays RA to RE are de-energized and contacts ra1 to re1 are all closed.

When the glucose begins to emerge from the column the density of the effluent begins to rise. This is detected by the density measuring instrument and switch DH closes when the density reaches a predetermined value. This completes the circuit to rotary switch RS2 and moves it to position 1. The circuit is broken at contact 6, so valve V11 closes. Volume control means VM3 is energised by closure of the circuit at contact 1 and this in turn opens valve V9 by closure of contact vm3 directing the effluent through VM3 and valve V9 to the concentrated glucose-rich product tank. When valve V9 is energised so is relay RA. This opens contact ra1 and prepares rotary switch RS2 for the next step. When the predetermined volume of effluent has passed, valve V9 is closed by the volume control means VM3 interrupting the circuit at vm3. At the same time relay RA is de-energised and contact ra1 is closed causing the rotary switch RS2 to move to position 2. The circuit at contact 1 is broken thus resetting the volume control means VM3.

Volume control means VM4 is energised by closure of the circuit at contact 2 and this in turn opens valve V6 by closure of contact vm4, thus directing the effluent through volume control means VM4 and valve V6 to the Recycle (I) storage tank. When valve V6 is energised so is relay RB. This opens contact rb1 and prepares rotary switch RS2 for the next step. When the predetermined volume of effluent has passed, valve V6 is closed by the volume control means VM4 interrupting the circuit at vm4. At the same time relay RB is de-energised and contact rb1 is closed causing the rotary switch RS2 to move to position 3. The circuit at contact 2 is broken thus resetting volume control means VM4.

Volume control means VM5 is energised by closure of the circuit at contact 3 and this in turn opens valve V7 by closure of contact vm5, thus directing the effluent through volume control means VM5 and valve V7 to the Recycle (II) storage tank. When valve V7 is energised so is Relay RC. This opens contact rc1 and prepares switch RS2 for the next step. When the predetermined volume of effluent has passed, valve V7 is closed by the volume control means VM5 interrupting the circuit at vm5. At the same time relay RC is de-energised and contact rc1 is closed causing the rotary switch RS2 to move to position 4. The circuit at contact 3 is broken thus resetting the volume control means VM5.

Volume control means VM6 is energized by closure of the circuit at contact 4 and this in turn opens valve V10 by closure of contact vm6, thus directing the effluent through volume control means VM6 and valve V10 to the concentrated fructose-rich product tank. When valve V10 is energised so is relay RD. This opens contact rd1 and prepares rotary switch RS2 for the next step. When the predetermined volume of effluent has passed, valve V10 is closed by the volume control means VM6 interrupting the circuit at vm6. At the same time relay RD is de-energized and contact rd1 is closed causing the rotary switch RS2 to move to position 5. The circuit at contact 4 is broken thus resetting the volume control means VM6.

Volume control means VM7 is energised by closure of the circuit at contact 5 and this in turn opens valve V8 by closure of contact vm7, thus directing the effluent through volume control means VM7 and valve V8 to the Recycle (III) storage tank. When valve V8 is energised so is relay RE. This opens contact re1 and prepares rotary switch RS2 for the next step. When the predetermined volume of effluent has passed, valve V8 is closed by the volume control means VM7 interrupting the circuit at vm7. At the same time relay RE is de-energised and contact re1 is closed causing the rotary switch to move to position 6. The circuit at contact 5 is broken thus resetting the volume control means VM7.

Valve V11 is opened by closure of the circuit at contact 6 thus directing the effluent through valve V11 to the sweet water tank. When the density of the effluent falls below the predetermined value the switch DH opens thus preparing rotary switch RS2 for the next step.

This completes one full cycle of operation and the control circuit is now in the same state as at the beginning of the cycle.

We claim:

1. A process for the separation of fructose and glucose from a syrup containing them, said process comprising the steps:
   (1) sequentially admitting predetermined volumes of said syrup and water to a column charged with a water-immersed bed of the alkaline earth metal salt of a cross-linked nuclearly sulphonated polystyrene cation exchange resin;
   (2) separating the effluent from the column sequentially into at least the fractions—
      (i) sweet water (I) consisting of dilute glucose-rich solution,
      (ii) concentrated glucose-rich solution,
      (iii) recycle (I) consisting of concentrated glucose-rich solution highly contaminated with fructose,
      (iv) recycle (II) consisting of concentrated fructose-rich solution highly contaminated with glucose,
      (v) concentrated fructose-rich solution,
      (vi) dilute fructose-rich solution;
   (3) admitting sequentially to the column at least the fractions—
      (xi) recycle (I),
      (xii) predetermined volume of said syrup,
      (xiii) recycle (II),
      (xiv) predetermined volume of water;
   (4) repeating steps 2 and 3 in a cyclic manner.

2. A process according to claim 1, wherein step 3 is additionally characterised by introducing a fraction (xiii)(A) between fractions (xiii) and (xiv), said fraction (xiii)(A) consisting of recycled effluent fraction (vi).

3. A process according to claim 1, wherein step 2 is additionally characterised by collecting effluent (vi) as two fractions—
   (vi)(a) recycle (III) consisting of dilute fructose-rich solution,
   (vi)(b) sweet water (II) consisting of very dilute fructose-rich solution;
and wherein step 3 is additionally characterised by introducing a fraction (xiii)(B) between fractions (xiii) and (xiv), said fraction (xiii)(B) consisting of said recycle (III).

4. A process for the separation of fructose and glucose from an invert syrup containing them, said process comprising the steps:
   (1) sequentially admitting predetermined volumes of said syrup and water to a column charged with a water-immersed bed of the alkaline earth metal salt of a cross-linked cation exchange resin consisting of nuclearly sulphonated polystyrene crosslinked with divinylbenzene;
   (2) separating the effluent from the column sequentially into at least the fractions—
      (i) sweet water (I) consisting of dilute glucose-rich solution,
      (ii) concentrated glucose-rich solution,
      (iii) recycle (I) consisting of concentrated glucose-rich solution highly contaminated with fructose,
      (iv) recycle (II) consisting of concentrated fructose-rich solution highly contaminated with glucose, (v) concentrated fructose-rich solution,
(vi)(a) recycle (III) consisting of dilute fructose-rich solution,
(vi)(b) sweet water (II) consisting of very dilute fructose-rich solution;
(3) admitting sequentially to the column at least the fractions—
(xi) recycle (I),
(xii) predetermined volume of said syrup,
(xiii)(a) recycle (II),
(xiii)(b) recycle (III),
(xiv) predetermined volume of water;
(4) repeating steps 2 and 3 in a cyclic manner.

5. A process according to claim 4 which includes the additional steps: evaporating said concentrated glucose-rich solution (ii); seeding the evaporated liquor with glucose crystals; slowly lowering the temperature to facilitate crystallisation; separating resultant crystals from the mother liquor.

6. A process according to claim 4 which includes the additional steps: evaporating said concentrated fructose-rich solution (v); seeding the evaporated liquor with fructose crystals; slowly lowering the temperature to facilitate crystallisation; separating resultant crystals from the mother liquor.

7. A process according to claim 4 in which the resin has a particle size in the mesh range 35–70 (U.S. Standard Sieve), the divinylbenzene content of the resin is selected from the range 2%–8% by weight and the alkaline earth metal salt is a calcium salt.

References Cited

UNITED STATES PATENTS

| | | | |
|---|---|---|---|
| 2,815,322 | 12/1957 | Higgins | 210—33 |
| 3,044,905 | 7/1962 | Lefevre | 127—30 X |
| 3,044,906 | 7/1962 | Lefevre | 127—46 |
| 3,214,293 | 10/1965 | Mountfort | 127—9 |

MORRIS O. WOLK, *Primary Examiner.*

S. MARANTZ, *Assistant Examiner.*

U.S. Cl. X.R.

127—9, 30, 42, 46, 60